(12) United States Patent
Van Dingenen et al.

(10) Patent No.: US 11,788,607 B2
(45) Date of Patent: Oct. 17, 2023

(54) TRANSMISSION, IN PARTICULAR FOR A VEHICLE

(71) Applicant: Dana Belgium N.V., Bruges (BE)

(72) Inventors: Joachim Van Dingenen, Bruges (BE); Bert Hannon, Bruges (BE); Kurt Cattoor, Bruges (BE); Tommy Van Acker, Bruges (BE)

(73) Assignee: Dana Belgium N.V., Bruges (BE)

( * ) Notice: Subject to any disclaimer, the term of this patent is extended or adjusted under 35 U.S.C. 154(b) by 202 days.

(21) Appl. No.: 17/446,820

(22) Filed: Sep. 2, 2021

(65) Prior Publication Data

US 2022/0065331 A1 Mar. 3, 2022

(30) Foreign Application Priority Data

Sep. 3, 2020 (DE) .................... 10 2020 211 129.4

(51) Int. Cl.
| | |
|---|---|
| *F16H 3/091* | (2006.01) |
| *F16H 61/04* | (2006.01) |
| *B60K 17/08* | (2006.01) |
| *B60K 17/28* | (2006.01) |
| *B60K 1/00* | (2006.01) |

(52) U.S. Cl.
CPC ............ *F16H 3/091* (2013.01); *B60K 17/08* (2013.01); *F16H 61/0403* (2013.01); *B60K 1/00* (2013.01); *B60K 17/28* (2013.01); *B60K 2001/001* (2013.01); *F16H 2200/0021* (2013.01); *F16H 2200/0034* (2013.01)

(58) Field of Classification Search
CPC ...... F16H 3/091; F16H 31/0403; B60K 17/08

USPC .......................................................... 74/661
See application file for complete search history.

(56) References Cited

U.S. PATENT DOCUMENTS

| | | | | |
|---|---|---|---|---|
| 9,446,829 | B1* | 9/2016 | Williams | .................. F16H 3/04 |
| 10,995,824 | B1* | 5/2021 | Bielefeld | ................ F16H 3/091 |
| 11,203,401 | B1* | 12/2021 | Bielefeld | .................. F16H 3/10 |
| 2022/0128124 | A1* | 4/2022 | Engerman | ............... F16H 3/006 |
| 2022/0128127 | A1* | 4/2022 | Von Koenigsegg | .... F16H 3/091 |
| 2022/0145965 | A1* | 5/2022 | Maurel | .................... F16H 3/006 |
| 2022/0170534 | A1* | 6/2022 | Hannon | .................. F16H 3/727 |
| 2022/0220703 | A1* | 7/2022 | McKinzie | ............. E02F 9/2267 |

(Continued)

FOREIGN PATENT DOCUMENTS

EP 0489451 A2 6/1992

*Primary Examiner* — Ha Dinh Ho
(74) *Attorney, Agent, or Firm* — McCoy Russell LLP

(57) ABSTRACT

A transmission, such as a transmission for a vehicle, a driveline including the transmission, and a method of performing a gear shift using the transmission. The transmission comprises a first transmission shaft, a first gear disposed on the first transmission shaft, a first wet clutch, and a first synchronizer. The first wet clutch and the first synchronizer are configured to selectively drivingly engage the first gear with the first transmission shaft and are connectable in series between the first gear and the first transmission shaft, such that the first gear is drivingly engaged with the first transmission shaft only when both the first wet clutch and the first synchronizer are engaged, and such that the first gear is drivingly disengaged from the first transmission shaft when either one or both of the first wet clutch and the first synchronizer is/are disengaged.

20 Claims, 2 Drawing Sheets

(56) References Cited

U.S. PATENT DOCUMENTS

2022/0243812 A1* 8/2022 Mock .................. F16D 25/02
2022/0250607 A1* 8/2022 McKinzie ............ B60W 10/08

* cited by examiner

TRANSMISSION, IN PARTICULAR FOR A VEHICLE

CROSS-REFERENCE TO RELATED APPLICATION

The present application claims priority to German Patent Application No. 10 2020 211 129.4, entitled "TRANSMISSION, IN PARTICULAR FOR A VEHICLE", and filed on Sep. 3, 2020. The entire contents of the above-listed application are hereby incorporated by reference for all purposes.

TECHNICAL FIELD

The present disclosure relates to a transmission, such as a transmission for a vehicle.

BACKGROUND AND SUMMARY

Wet clutches are widely used in transmissions, for example in transmission for automotive vehicles. Wet clutches typically include a first set of plates coupled with or configured to be coupled with a first shaft, and a second set of plates coupled with or configured to be coupled with a second shaft. Usually, the first and the second set of plates form a clutch pack in which the first and the second set of plates are alternatingly disposed along an axial direction. The first shaft and the second shaft may be drivingly engaged with one another by frictionally engaging the first set of plates with the second set of plates, typically by compressing the alternatingly disposed plates along the axial direction.

In a wet clutch the first and the second set of plates are disposed in a clutch drum or clutch housing which is filled or at least partially filled with a liquid such as a lubricant. Among other things, the liquid may be used to cool the plates of the clutch pack, such as during the process of engaging or disengaging the first and second set of plates when great amounts of heat may be produced. In this manner, the risk of burning the clutch plates may be reduced and the longevity and the safety of the clutch may be improved.

However, when the clutch plates are not engaged, the liquid within the clutch drum or clutch housing may exert an unwanted drag on the plates and on the shaft to which the plates are coupled, thereby reducing the efficiency of the transmission.

Thus, the problem underlying the present disclosure consists in providing a transmission including a wet clutch and having an improved efficiency.

This object is solved by a transmission and by a method of shifting gears according to features of the embodiments described herein. This object is further solved by a driveline including features of embodiments the transmission described herein.

According to various embodiments described, the presently proposed transmission comprises:
a first transmission shaft,
a first gear disposed on the first transmission shaft,
a first wet clutch, and
a first synchronizer,
wherein the first wet clutch and the first synchronizer are configured to selectively drivingly engage the first gear with the first transmission shaft and are connected or connectable in series between the first gear and the first transmission shaft, such that the first gear is drivingly engaged with the first transmission shaft only when both the first wet clutch and the first synchronizer are engaged, and such that the first gear is drivingly disengaged from the first transmission shaft when either one or both of the first wet clutch and the first synchronizer is/are disengaged.

As the first wet clutch and the first synchronizer are connected or connectable in series between the first gear and the first transmission shaft, the first synchronizer may disengage the first wet clutch from the first gear or from the first transmission shaft. This may reduce a drag which the first wet clutch may exert on the transmission, for example when the first wet clutch is disengaged.

The first wet clutch and the first synchronizer may be disposed on the first transmission shaft. A portion of the first wet clutch may be rigidly connected with a portion of the first synchronizer. For example, the first wet clutch may include a first rotatable portion and a second rotatable portion which are configured to be selectively drivingly engaged with one another, and the first synchronizer may include a first rotatable portion and a second rotatable portion which are configured to be selectively drivingly engaged with one another. One of the first and the second rotatable portion of the first wet clutch may then be rigidly connected with one of the first and the second rotatable portion of the first synchronizer. A mass and/or a moment of inertia of the rigidly connected portions of the first wet clutch and of the first synchronizer may be lower than a mass and/or a moment of inertia of the first gear, for example by a factor of two or more, by a factor of four or more, or by a factor of ten or more. The first gear may be selectively drivingly engaged with the first wet clutch via the first synchronizer.

The transmission may further comprise a second transmission shaft, and a second gear disposed on the second transmission shaft and drivingly engaged with or in mesh with the first gear. For example, the second gear may be mounted on the second transmission shaft via a torque proof connection such as via a splined connection. The second gear may also be rigidly mounted on the second transmission shaft.

The transmission may further comprise a third gear disposed on the first transmission shaft, and a fourth gear disposed on the second transmission shaft and drivingly engaged with or in mesh with the third gear. For example, the third gear may be mounted on the first transmission shaft via a torque proof connection such as via a splined connection. The third gear may also be rigidly mounted on the second transmission shaft.

The transmission may further comprise a second wet clutch and a second synchronizer. The second wet clutch and the second synchronizer may be configured to selectively drivingly engage the fourth gear with the second transmission shaft and may be connected or connectable in series between the fourth gear and the second transmission shaft, such that the fourth gear is drivingly engaged with the second transmission shaft only when both the second wet clutch and the second synchronizer are engaged, and such that the fourth gear is drivingly disengaged from the second transmission shaft when either one or both of the second wet clutch and the second synchronizer is/are disengaged. The second wet clutch and the second synchronizer may be disposed on the second transmission shaft. The fourth gear may be selectively drivingly engaged with the second wet clutch via the second synchronizer.

Alternatively, the third gear may be selectively drivingly engaged with the first transmission shaft, and the fourth gear may be mounted on the second transmission shaft via a torque proof connection such as via a splined connection, or the fourth gear may be rigidly mounted on the second transmission shaft. In this case the second wet clutch and the second synchronizer may be configured to selectively drivingly engage the third gear with the first transmission shaft and may be connected or connectable in series between the third gear and the first transmission shaft, such that the third gear is drivingly engaged with the first transmission shaft only when both the second wet clutch and the second synchronizer are engaged, and such that the third gear is drivingly disengaged from the first transmission shaft when either one or both of the second wet clutch and the second synchronizer is/are disengaged. For example, the second wet clutch and the second synchronizer may be disposed on the first transmission shaft. The third gear may then be selectively drivingly engaged with the second wet clutch via the second synchronizer.

A portion of the second wet clutch may be rigidly connected with a portion of the second synchronizer. For example, the second wet clutch may include a first rotatable portion and a second rotatable portion which are configured to be selectively drivingly engaged with one another, and the second synchronizer may include a first rotatable portion and a second rotatable portion which are configured to be selectively drivingly engaged with one another. One of the first and the second rotatable portion of the second wet clutch may then be rigidly connected with one of the first and the second rotatable portion of the second synchronizer. A mass and/or a moment of inertia of the rigidly connected portions of the second wet clutch and of the second synchronizer may be lower than a mass and/or a moment of inertia of the third gear or of the fourth gear, for example by a factor of two or more, by a factor of four or more, or by a factor of ten or more.

Further, a driveline is presently proposed, the driveline comprising the previously described transmission and at least one power source. The power source may include one or more electric motors and/or one or more internal combustion engines. The power source may be drivingly engaged with or selectively drivingly engaged with the first transmission shaft.

The driveline may further comprise a vehicle axle drivingly engaged with or selectively drivingly engaged with at least one of the first transmission shaft and the second transmission shaft.

Further, a method of shifting gears using the above-described transmission is presently proposed, the method comprising the steps:

when the first wet clutch and the first synchronizer are engaged and the second wet clutch and the second synchronizer are disengaged such that the first transmission shaft is drivingly engaged with the second transmission shaft via the first gear and the second gear, closing the second synchronizer, when the second synchronizer has been engaged, closing the second wet clutch and disengaging the first wet clutch while keeping the first synchronizer engaged, and when the first wet clutch has been disengaged, disengaging the first synchronizer to reduce a drag of the first wet clutch.

When the first synchronizer has been disengaged the first wet clutch may be re-engaged.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Embodiments of the presently proposed transmission, driveline and method are depicted in the figures and are explained in the following detailed description. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
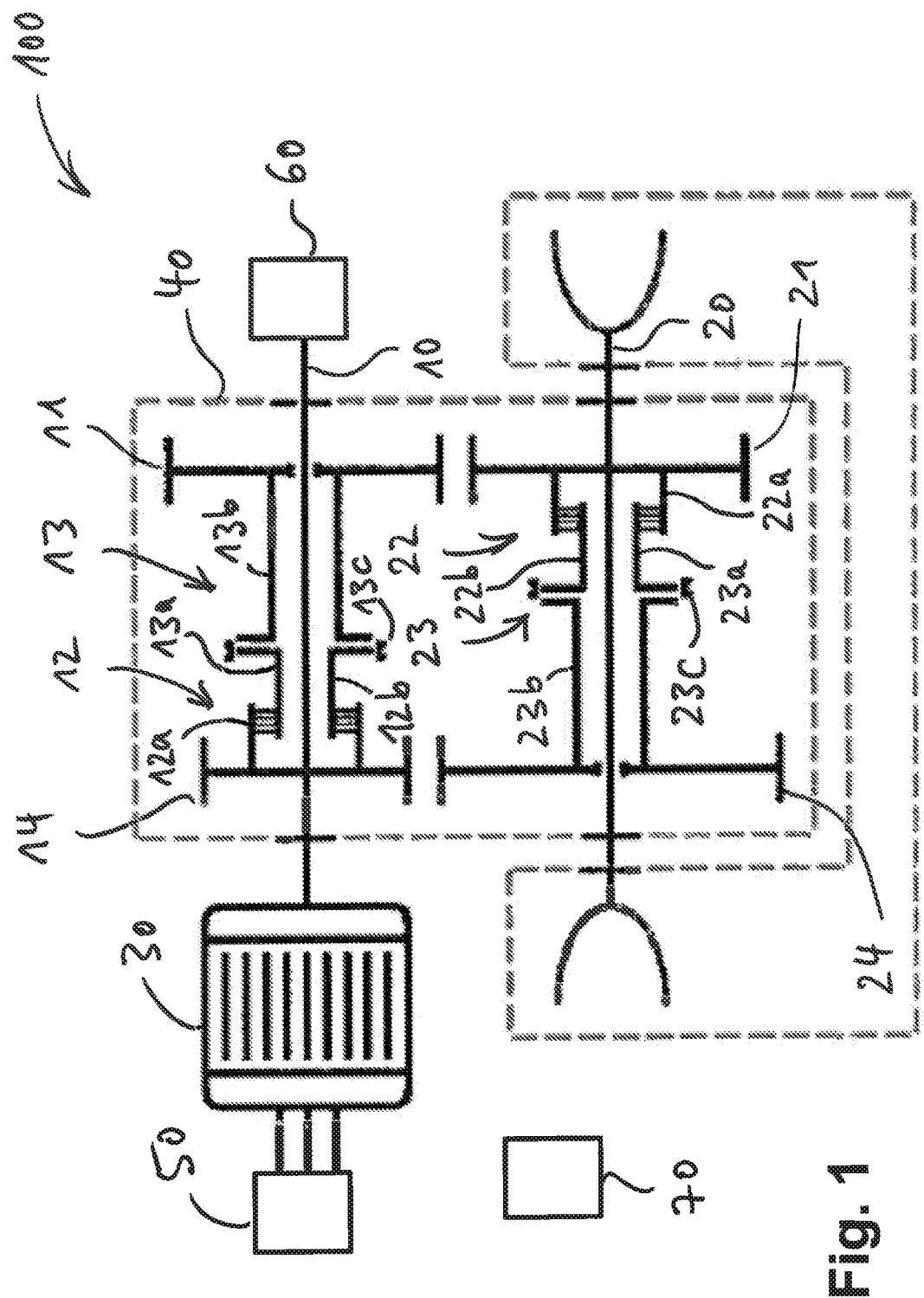
FIG. 1 shows an embodiment of driveline including a transmission of the presently proposed type.

FIG. 1 shows a first embodiment of a driveline 100. The driveline 100 may be included in a vehicle, for example in an off-highway vehicle such as a wheel loader, an excavator, a dumper, a material handling vehicle, a tractor, a harvester, a mining vehicle, or the like. The driveline 100 includes a power source 30 and a transmission 40. Here, the power source 30 includes an electric motor electrically connected with an inverter 50. The inverter 50 may be electrically connected with an energy storage device such as with a battery or with a rechargeable battery (not shown). However, it is understood that in alternative embodiments the power source 30 may include an internal combustion engine, for example.

The driveline 100 may further include a vehicle output (not shown) drivingly engaged or selectively drivingly engaged with the transmission 40. The vehicle output may include one or more drive axles, one or more differentials, one or more reduction drives, and/or a ground engaging structures including one or more wheel hubs or wheels, for example. The power source 30 may be drivingly engaged with or selectively drivingly engaged with the vehicle output via the transmission 40.

The transmission 40 includes at least a first transmission shaft 10 and a second transmission shaft 20. The first transmission shaft 10 is drivingly connected with the power source 30. Here, the first transmission shaft 10 is directly drivingly connected with or unitarily formed with an output shaft of the power source 30. However, it is understood that in alternative embodiments the first transmission shaft 10 may be drivingly connected or selectively drivingly connected with the power source via further shafts and gears, clutches and/or via a torque converter. The transmission 40 further comprises a power take-off 60 drivingly connected with the first transmission shaft 10. The power take-off 60 may be used to drive one more implements, for example. For instance, the power take-off 60 may be used to drive a hydraulic pump which in turn may drive one or more hydraulic motors and/or one or more hydraulic cylinders. Here, the power take-off 60 is directly drivingly connected with the power first transmission shaft 10. However, it is understood that in alternative embodiments the power take-off 60 may be drivingly connected or selectively drivingly connected with the first transmission shaft 10 or with the power source 30 via further gears, shafts or clutches.

The transmission 40 further includes a first gear 11, a second gear 21, a third gear 14 and a fourth gear 24. The first gear 11 and the third gear 14 are disposed on the first transmission shaft 10. The second gear 21 and the fourth gear 24 are disposed on the second transmission shaft 20. The first gear 11 is drivingly engaged with or in mesh with the second gear 21. The third gear 14 is drivingly engaged with or in mesh with the fourth gear 24.

In the embodiment depicted in FIG. 1 the third gear 14 is mounted on the first transmission shaft 10 in a torque proof manner, for example via a splined connection. Alternatively, the third gear 14 may be rigidly mounted on the first transmission shaft 10, or the third gear 14 may be formed in one piece with the first transmission shaft 10. Similarly, the second gear 21 is mounted on the second transmission shaft 20 in a torque proof manner, for example via a splined connection. Alternatively, the second gear 21 may be rigidly mounted on the second transmission shaft 20, or the second gear 21 may be formed in one piece with the second transmission shaft 20.

The transmission 40 further includes a first wet clutch 12 and a first synchronizer 13. The first wet clutch 12 and the first synchronizer 13 are disposed or mounted on the first transmission shaft 10. The first wet clutch 12 and the first synchronizer 13 are configured to selectively drivingly engage the first gear 11 with the first transmission shaft 10. More specifically, the first wet clutch 12 and the first synchronizer 13 are connected in series between the first gear 11 and the first transmission shaft 10. That is, the first gear 11 is drivingly engaged with the first transmission shaft 10 only when both the first wet clutch 12 and the first synchronizer 13 are engaged or closed. On the other hand, the first gear 11 is drivingly disengaged from the first transmission shaft 10 when either one or both of the first wet clutch 12 and the first synchronizer 13 is/are disengaged or open.

The first wet clutch 12 comprises a first rotatable portion 12a, a second rotatable portion 12b, a first set of clutch plates coupled with the first rotatable portion 12a, and a second set of clutch plates coupled with the second rotatable portion 12b. The clutch plates of the first wet clutch 12 are alternatingly disposed along the first transmission shaft 10. The first rotatable portion 12a and the second rotatable portion 12b of the first wet clutch 12 may be selectively engaged with one another or selectively rotationally locked to one another by compressing the clutch pack including the first set of clutch plates and the second set of clutch plates of the first wet clutch 12, for example by means of a first clutch piston. The first clutch piston may be actuatable through hydraulic or electromagnetic forces, for example. The clutch plates of the first wet clutch 12 are disposed within a clutch drum or clutch housing that is filled or at least partially filled or that is configured to be filled or configured to be at least partially filled with a liquid such as with a lubricant. That is, the clutch plates of the first wet clutch 12 are submersed or at least partially submersed or are configured to be submersed or configured to be at least partially submersed in a liquid such as in a lubricant held within the clutch drum or clutch housing of the first wet clutch 12.

The first synchronizer 13 comprises a first rotatable portion 13a, a second rotatable portion 13b, and a first movable member 13c such as a shift collar. The first rotatable portion 13a and the second rotatable portion 13b of the first synchronizer 13 may be frictionally engaged with one another. When the first rotatable portion 13a and the second rotatable portion 13b of the first synchronizer 13 are frictionally engaged with one another and rotate at the same speed or at essentially the same speed, the first rotatable portion 13a and the second rotatable portion 13b of the first synchronizer 13 may be selectively rotationally locked to one another by means of the first movable member 13c. For example, the first synchronizer 13 may include a synchromesh unit. However, it is understood that the first synchronizer 13 may also include other known mechanical synchronization mechanisms.

The first gear 11 is drivingly engageable with the first wet clutch 12 via the first synchronizer 13. More specifically, the first rotatable portion 12a of the first wet clutch 12 is rigidly connected or formed in one piece with the first transmission shaft 10, the second rotatable portion 12b of the first wet clutch 12 is rigidly connected or formed in one piece with the first rotatable portion 13a of the first synchronizer 13, and the second rotatable portion 13b of the first synchronizer 13 is rigidly connected or formed in one piece with the first gear 11. A mass or a moment of inertia of the first gear 11 may be larger than a combined mass or a combined moment of inertia of the second rotatable portion 12b of the first wet clutch 12 and the first rotatable portion 13a of the first synchronizer 13, for example by a factor of two or more, by a factor of four or more, or by a factor of ten or more.

The transmission 40 further includes a second wet clutch 22 and a second synchronizer 23. The second wet clutch 22 and the second synchronizer 23 are disposed or mounted on the second transmission shaft 20. The second wet clutch 22 and the second synchronizer 23 are configured to selectively drivingly engage the fourth gear 24 with the second transmission shaft 20. More specifically, the second wet clutch 22 and the second synchronizer 23 are connected in series between the fourth gear 24 and the second transmission shaft 20. That is, the fourth gear 24 is drivingly engaged with the second transmission shaft 20 only when both the second wet clutch 22 and the second synchronizer 23 are engaged or closed. On the other hand, the fourth gear 24 is drivingly disengaged from the second transmission shaft 20 when either one or both of the second wet clutch 22 and the second synchronizer 23 is/are disengaged or open.

The second wet clutch 22 comprises a first rotatable portion 22a, a second rotatable portion 22b, a first set of clutch plates coupled with the first rotatable portion 22a, and a second set of clutch plates coupled with the second rotatable portion 22b. The clutch plates of the second wet clutch 22 are alternatingly disposed along the second transmission shaft 20. The first rotatable portion 22a and the second rotatable portion 22b of the second wet clutch 22 may be selectively engaged with one another or selectively rotationally locked to one another by compressing the clutch pack including the first set of clutch plates and the second set of clutch plates of the second wet clutch 22, for example by means of a second clutch piston. The second clutch piston may be actuatable through hydraulic or electromagnetic forces, for example. The clutch plates of the second wet clutch 22 are disposed within a clutch drum or clutch housing that is filled or at least partially filled or that is configured to be filled or configured to be at least partially filled with a liquid such as with a lubricant. That is, the clutch plates of the second wet clutch 22 are submersed or at least partially submersed or are configured to be submersed or configured to be at least partially submersed in a liquid such as in a lubricant held within the clutch drum or clutch housing of the second wet clutch 22.

The second synchronizer 23 comprises a first rotatable portion 23a, a second rotatable portion 23b, and a second movable member 23c such as a shift collar. The first rotatable portion 23a and the second rotatable portion 23b of the second synchronizer 23 may be frictionally engaged with one another. When the first rotatable portion 23a and the second rotatable portion 23b of the second synchronizer 23 are frictionally engaged with one another and rotate at the same speed or at essentially the same speed, the first rotatable portion 23a and the second rotatable portion 23b of the second synchronizer 23 may be selectively rotationally locked to one another by means of the second movable member 23c. For example, the second synchronizer 23 may include a synchromesh unit. However, it is understood that the second synchronizer 23 may also include other known mechanical synchronization mechanisms.

The fourth gear 24 is drivingly engageable with the second wet clutch 22 via the second synchronizer 23. More specifically, the first rotatable portion 22a of the second wet clutch 22 is rigidly connected or formed in one piece with the second transmission shaft 20, the second rotatable portion 22b of the second wet clutch 22 is rigidly connected or formed in one piece with the first rotatable portion 23a of the second synchronizer 23, and the second rotatable portion 23b of the second synchronizer 23 is rigidly connected or formed in one piece with the fourth gear 24. A mass or a moment of inertia of the fourth gear 24 may be larger than a combined mass or a combined moment of inertia of the second rotatable portion 22b of the second wet clutch 22 and the first rotatable portion 23a of the second synchronizer 23, for example by a factor of two or more, by a factor of four or more, or by a factor of ten or more.

The driveline 100 further includes an electronic control unit 70. The electronic control unit 70 may include electronic circuitry such as one or more programmable processing units, for example one or more microprocessors and/or one more Field Programmable Gate Arrays (FPGA) or the like. The electronic control unit 70 is configured to control the power source 30 and the transmission 40. In the embodiment depicted in FIG. 1 the electronic control unit 70 may further be configured to control the inverter 50. The electronic control unit 70 may be connected with the power source 30, the transmission 40 and the inverter 50 via wired or wireless connections, for example (not shown). For example, the control unit 70 may be configured to control a power and/or a speed of the power source 30, such as a time course of the power and/or of the speed of the power source 30. The electronic control unit 70 may be configured to control the engagement and the disengagement of the first wet clutch 12, of the first synchronizer 13, of the second wet clutch 22 and of the second synchronizer 23. More specifically, the control unit 70 may be configured to control the timing, including the relative timing, of the engagement and disengagement of the first wet clutch 12, of the first synchronizer 13, of the second wet clutch 22 and of the second synchronizer 23, such as during a gear shift.

In the embodiment depicted in FIG. 1 the transmission 40 provides two different drive ratios or gear ratios between the first transmission shaft 10 and the second transmission shaft 20. Specifically, when both of the first wet clutch 12 and the first synchronizer 13 are engaged and, simultaneously, either one or both of the second wet clutch 22 and the second synchronizer 23 is/are disengaged, the first transmission shaft 10 and the second transmission shaft 20 are drivingly engaged with one another via the first gear 11 and the second gear 21, the first gear 11 and the second gear 21 providing a high speed and a low torque at the second transmission shaft 20. And when either one or both of the first wet clutch 12 and the first synchronizer 13 is/are disengaged and, simultaneously, both of the second wet clutch 22 and the second synchronizer 23 are engaged, the first transmission shaft 10 and the second transmission shaft 20 are drivingly engaged with one another via the third gear 14 and the fourth gear 24, the third gear 14 and the fourth gear 24 providing a low speed and a high torque at the second transmission shaft 20.

It is understood that in alternative embodiments the transmission 40 may include more than two drive ratios between the first transmission shaft 10 and the second transmission shaft 20 and/or between the power source 30 and the second transmission shaft 20. For example, the transmission 40 may include additional gears and clutches/synchronizers and/or additional transmission shafts.

Figure 2:
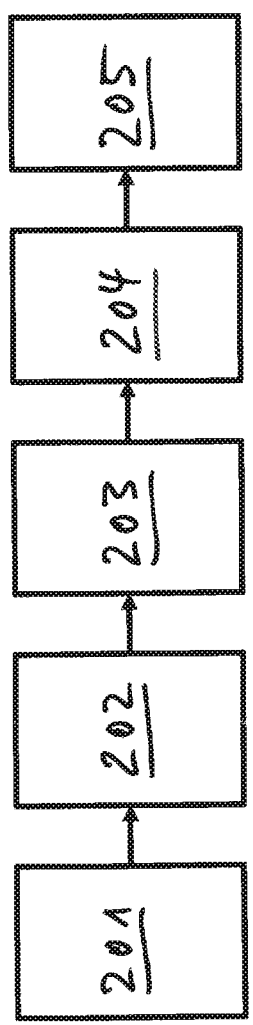
FIG. 2 shows steps of a method of performing a gear shift using the transmission of FIG. 1.

FIG. 2 depicts steps of a method of shifting the transmission 40 of FIG. 1. At 201, the electronic control unit 70 engages the first wet clutch 12 and the first synchronizer 13, and, simultaneously, the electronic control unit 70 disengages both the second wet clutch 22 and the second synchronizer 23. That is, at 201 the first transmission shaft 10 is drivingly engaged with the second transmission shaft 20 via the first gear 11 and the second gear 21, the first gear 11 and the second gear 21 providing a high speed and a low torque at the second transmission shaft 20. As the disengaged second synchronizer 23 decouples the relatively high mass and large inertia fourth gear 24 from the second wet clutch 22, a drag the second wet clutch 22 exerts on the driveline 100 is significantly reduced with respect to traditional drivelines which do not allow decoupling of the fourth gear 24 from the second wet clutch 22 in the same configuration or in a similar configuration.

At 202, the control unit 70 initiates a powershift or power downshift aiming at handing torque transmission between the first transmission shaft 10 and the second transmission shaft 20 from the first gear 11 and the second gear 21 over to the third gear 14 and the fourth gear 24. Initiating the downshift at 202 includes the control unit 70 engaging the second synchronizer 23, thereby preparing the engagement of the fourth gear 24 with the second transmission shaft by means of the second wet clutch 22. When the control unit 70 has engaged the second synchronizer 23, the control unit 70 proceeds to 203.

At 203, the control unit 70 engages the second wet clutch 22 and disengages the first wet clutch 12 while keeping the first synchronizer 13 engaged. The control unit 70 may engage the second wet clutch 22 and disengage the first wet clutch 12 simultaneously, so that torque transmission via the first gear 11 and the second gear 21 and torque transmission via the third gear 14 and the fourth gear 24 overlap during the downshift. In this manner, a continuous or seamless output torque may be provided at the second transmission shaft 20 during the shift. When the first wet clutch 12 has been disengaged, the control unit 70 proceeds to 204.

At 204, the control unit 70 disengages the first synchronizer 13 in order to decouple the relatively high mass and high inertia first gear 11 from the disengaged first wet clutch 12 in order to reduce a drag the first wet clutch 12 may exert on the driveline 100. When the first synchronizer 13 has been disengaged, the control unit 70 may proceed to 205.

At 205, the control unit 70 may re-engage the previously disengaged first wet clutch 12, thereby rotationally locking the first rotatable portion 12a and the second rotatable portion 12b of the first wet clutch 12 to one another in order to reduce a slip between the first rotatable portion 12a and the second rotatable portion 12b of the first wet clutch 12 to zero. This may further increase the efficiency of the driveline 100.

Given the symmetry of the transmission 40, from the foregoing description of a power downshift a person of ordinary skill readily understands how the driveline 100 may be used to perform a power upshift providing a handing over of torque transmission between the first transmission shaft 10 and the second transmission shaft 20 from the third gear 14 and the fourth gear 24 back to the first gear 11 and the second gear 21 in an analogous manner.

FIG. 1 shows and example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A transmission comprising:
a first transmission shaft;
a first gear disposed on the first transmission shaft;
a first wet clutch; and
a first synchronizer,
wherein the first wet clutch and the first synchronizer are configured to selectively drivingly engage the first gear with the first transmission shaft and are connected or connectable in series between the first gear and the first transmission shaft, such that the first gear is drivingly engaged with the first transmission shaft only when both the first wet clutch and the first synchronizer are engaged, and such that the first gear is drivingly disengaged from the first transmission shaft when either one or both of the first wet clutch and the first synchronizer is/are disengaged.

2. The transmission of claim 1, wherein the first wet clutch and the first synchronizer are disposed on the first transmission shaft and a portion of the first wet clutch is rigidly connected with a portion of the first synchronizer.

3. The transmission of claim 1, wherein the first gear is selectively drivingly engageable with the first wet clutch via the first synchronizer.

4. The transmission of claim 1, further comprising:
a second transmission shaft; and
a second gear disposed on the second transmission shaft, and drivingly engaged with or in mesh with the first gear.

5. The transmission of claim 4, further comprising:
a third gear disposed on the first transmission shaft; and
a fourth gear disposed on the second transmission shaft and drivingly engaged with or in mesh with the third gear.

6. The transmission of claim 5, further comprising:
a second wet clutch; and
a second synchronizer,
wherein the second wet clutch and the second synchronizer are configured to selectively drivingly engage the fourth gear with the second transmission shaft and are connected or connectable in series between the fourth gear and the second transmission shaft, such that the fourth gear is drivingly engaged with the second transmission shaft only when both the second wet clutch and the second synchronizer are engaged, and such that the fourth gear is drivingly disengaged from the second transmission shaft when either one or both of the second wet clutch and the second synchronizer is/are disengaged.

7. The transmission of claim 6, wherein the second wet clutch and the second synchronizer are disposed on the second transmission shaft and a portion of the second wet clutch is rigidly connected with a portion of the second synchronizer.

8. The transmission of claim 6, wherein the fourth gear is selectively drivingly engageable with the second wet clutch via the second synchronizer.

9. A driveline comprising:
the transmission of claim 4;
one or more electric motors and/or one or more internal combustion engines drivingly engaged with or selectively drivingly engaged with the first transmission shaft; and
a vehicle axle drivingly engaged with or selectively drivingly engaged with the second transmission shaft.

10. The driveline of claim 9, further comprising:
a third gear disposed on the first transmission shaft; and
a fourth gear disposed on the second transmission shaft and drivingly engaged with or in mesh with the third gear.

11. The driveline of claim 10, further comprising:
a second wet clutch; and
a second synchronizer,
wherein the second wet clutch and the second synchronizer are configured to selectively drivingly engage the fourth gear with the second transmission shaft and are connected or connectable in series between the fourth gear and the second transmission shaft, such that the fourth gear is drivingly engaged with the second transmission shaft only when both the second wet clutch and the second synchronizer are engaged, and such that the fourth gear is drivingly disengaged from the second transmission shaft when either one or both of the second wet clutch and the second synchronizer is/are disengaged.

12. The driveline of claim 11, wherein the second wet clutch and the second synchronizer are disposed on the second transmission shaft and a portion of the second wet clutch is rigidly connected with a portion of the second synchronizer.

13. The driveline of claim 11, wherein the fourth gear is selectively drivingly engageable with the second wet clutch via the second synchronizer.

14. The driveline of claim 9, wherein the first wet clutch and the first synchronizer are disposed on the first transmission shaft and a portion of the first wet clutch is rigidly connected with a portion of the first synchronizer.

15. The driveline of claim 9, wherein the first gear is selectively drivingly engageable with the first wet clutch via the first synchronizer.

16. A method of shifting gears using the transmission of claim 6, the method comprising the steps:
   when the first wet clutch and the first synchronizer are engaged and the second wet clutch and the second synchronizer are disengaged such that the first transmission shaft is drivingly engaged with the second transmission shaft via the first gear and the second gear, engaging the second synchronizer;
   when the second synchronizer has been engaged, engaging the second wet clutch and disengaging the first wet clutch while keeping the first synchronizer engaged; and
   when the first wet clutch has been disengaged, disengaging the first synchronizer to reduce a drag of the first wet clutch.

17. The method of claim 16, further comprising the step:
   when the first synchronizer has been disengaged, re-engaging the first wet clutch.

18. The method of claim 16, wherein the first wet clutch and the first synchronizer are disposed on the first transmission shaft and a portion of the first wet clutch is rigidly connected with a portion of the first synchronizer, and wherein the first gear is selectively drivingly engageable with the first wet clutch via the first synchronizer.

19. The method of claim 16, wherein the second wet clutch and the second synchronizer are disposed on the second transmission shaft and a portion of the second wet clutch is rigidly connected with a portion of the second synchronizer, and wherein the fourth gear is selectively drivingly engageable with the second wet clutch via the second synchronizer.

20. The method of claim 16, wherein one or more electric motors and/or one or more internal combustion engines is drivingly engaged with or selectively drivingly engaged with the first transmission shaft; and a vehicle axle is drivingly engaged with or selectively drivingly engaged with the second transmission shaft.

* * * * *